United States Patent Office
3,849,373
Patented Nov. 19, 1974

3,849,373
POLYMERIC UV STABILIZERS FOR SUBSTANTIALLY HYDROCARBON POLYMERS
John Carl Siegle and Homer Bagenstose Wolfe, Wilmington, Del., assignors to E. I. du Pont de Nemours and Company, Wilmington, Del.
No Drawing. Filed May 17, 1972, Ser. No. 254,234
Int. Cl. C08f 27/06, 27/08
U.S. Cl. 260—47 UP    5 Claims

ABSTRACT OF THE DISCLOSURE

A substantially hydrocarbon copolymeric stabilizer consisting of, on a weight basis, greater than 50% polymer repeat units derived from ethylene, propylene or a butene and less than 50% polymer repeat units derived from at least one comonomer which is copolymerizable with the ethylene, propylene or butene and which contains a reactive acidic or basic site, for example, a copolymer of ethylene and 2-(N,N-dimethylamino)-ethyl methacrylate, said copolymer having ionically bonded to the acidic or basic site a complementary basic or acidic site of an ultraviolet light absorber or antioxidant, for example, 2-carboxy-2'-hydroxy-5'-methylbenzophenone.

BACKGROUND OF THE INVENTION (1) Field of the Invention

This invention relates to antioxidants and ultraviolet light stabilizers for hydrocarbon polymers.

(2) Description of the Prior Art

Conferring of improved properties on a polymer may be accomplished by means of an adjuvant which is either coated onto or incorporated into the polymer. In some cases, the improved properties may be obtained by producing a copolymer which is prepared from one or more comonomers which possesses such characteristics as to impart the desired effect into the polymer, the problem of incompatibility often encountered with adjuvants and host polymers can be avoided; also avoided is loss of adjuvant by volatilization or sublimation during the processing of the polymer; and finally, the effect is resistant to wash out by organic or inorganic solvents with which the copolymer may come into contact.

SUMMARY OF THE INVENTION

Is is an object of the present invention to provide polymeric ultraviolet light stabilizers and antioxidants which can be compatibly blended with host, substantially hydrocarbon polymers. It is a further object to provide such polymeric stabilizers and antioxidants which are especially useful in polyethylene and in polypropylene. A still further object is to provide such stabilizers which resist removal from the host polymer by aqueous and non-aqueous extractants, and which are resistant to sublimation or volatilization during processing of the host polymer. Another object is to provide ultraviolet light stabilizers and antioxidants which do not adversely affect the properties of the host polymer.

The objects of the present invention are achieved by means of a substantially hydrocarbon copolymer which is useful as an ultraviolet light stabilizers or antioxidant and which consists of, a major fraction, that is, greater than 50 weight percent, of polymer repeat units derived from ethylene, propylene or a butene and a minor fraction, that is, less than 50 weight percent, of polymer repeat units derived from at least one comonomer which is copolymerizable with the ethylene, propylene or butene and which contains a reactive acidic or basis site, said copolymer having ionically bonded to the acidic or basic site a complementary basic or acidic site of an ultraviolet light stabilizer or antioxidant. This substantially hydrocarbon copolymer having ultraviolet light stabilizing or antioxidizing characteristics can be compatibly blended with a substantially hydrocarbon polymer which is to be stabilized against ultraviolet light or oxidation. Preferably, the substantially hydrocarbon copolymer contains at least 90 weight percent of polymer repeat units derived from ethylene, propylene or a butene.

DETAILED DESCRIPTION OF THE INVENTION

This invention is based on the discovery that certain polymeric ultraviolet light stabilizers or antioxidants can be compatibly blended into substantially hydrocarbon polymers. These certain polymeric materials are substantially hydrocarbon copolymers which have ultraviolet light stabilizers or antioxidants built into the copolymer backbone chain as pendant groups. They are prepared from copolymers of ethylene, propylene or a butene and at least one comonomer which contains an acidic or basic site, the acidic or basic site being reacted or neutralized with an ultraviolet light stabilizer or antioxidant having a complementary basic or acidic site. The copolymers of this invention thus have the ultraviolet light stabilizer or antioxidant ionically bonded thereto.

Substantially hydrocarbon copolymers having acidic or basic sites are well known in the art and are readily available by means or prior art preparative procedures. Copolymers having acidic sites include those disclosed in U.S. Pat. 3,264,272, such as copolymers of ethylene and $\alpha,\beta$-ethylenically unsaturated carboxylic acids and anhydrides thereof, preferably having 3–8 carbon atoms, for example, acrylic acid, methacrylic acid, ethacrylic acid, itaconic acid, maleic acid, fumaric acid and monoesters of said dicarboxylic acids.

Copolymers having basic sites include those disclosed in U.S. Pat. 3,395,198, such as copolymers of ethylene and an aminoalkyl acrylate or methacrylate, for example, aminomethyl acrylate, aminoethyl acrylate, amino-n-butyl acrylate, N-methylaminoethyl acrylate, N-ethylaminoethyl acrylate, N-ethylaminoisobutyl acrylate, N-ethylamino-n-butyl acrylate, N-isopropylaminomethyl acrylate, N - isopropylaminoethyl acrylate, N - n - butylaminoethyl acrylate, N-t-butylaminoethyl acrylate, N,N-dimethylaminomethyl acrylate, N,N - dimethylaminoethyl acrylate, N,N-dimethylaminoisopropyl acrylate, N,N-dimethylamino-n-butyl acrylate, N-methyl-N-ethylaminoethyl acrylate, N-methyl-N-n-butylaminoethyl acrylate, N,N-diethylaminoethyl acrylate, N,N-diisopropylaminoethyl acrylate, N,N-di-n-propylaminoethyl acrylate, N,N-di-n-propylamino-n-propyl acrylate, N,N-di-n-butylaminoethyl acrylate, N,N-di-n-butylamino-n-propyl acrylate, as well as the corresponding esters of methacrylic acid. Such comonomers can be represented by the formula $$CH_2=CR^1COOC_nH_{2n}N(R^2)R^3$$

wherein $R^1$ is H or $CH_3$, $R^2$ and $R^3$ are the same or different and are H or $C_{1-4}$ alkyl and $n$ is 2–4.

There are presently available many ultraviolet light stabilizers and antioxidants which are useful for increasing the life and the scope of application of hydrocarbon polymers, particularly polyethylene and polypropylene. Some of these known materials already possess acidic or basic sites and can be readily incorporated into and reacted with the aforesaid copolymers having complementary basic or acidic sites. Other such known materials which lack acidic or basic sites usually can be chemically modified to provide such sites without loss of their ultraviolet light stabilizing or antioxidizing characteristics. For example, a number of readily available, useful ultraviolet light absorbers are hydroxybenzophenones which have no ionically active groups. Many of these compounds can be readily sulfonated or carboxylated to provide an acidic site by which the compound can be attached to a copolymer as described above and having a complementary basic site.

Among the useful known antioxidants having basic or acidic sites are N-phenyl-α(or β)-naphthylamine, 4,4'-bis(dimethylamino)benzophenone, 2,6-di-t-butyl-4-(N,N-dimethylaminomethyl)phenol, p-aminophenol, p-anilinophenol and 3,5-di-t-butyl-4-hydroxybenzoic acid. Useful ultraviolet stabilizers include p-aminobenzoic acid, methyl p-aminobenzoate, sodium 2,4-dihydroxy-5-sulfobenzophenone, sodium 2-(2'-hydroxy-5'-methylphenyl)benzotriazolesulfonate, 2-carboxy-2'-hydroxy-5'-methylbenzophenone, 1-hydroxy-1'-carboxybenzophenone and alkali metal salts thereof, 1-hydroxy-4-alkyl-1'-carboxybenzophenones wherein the alkyl group has 1–13 carbon atoms.

The reaction of the copolymer having an acidic site and the adjuvant having a basic site can be carried out by dissolving the acidic copolymer in a suitable solvent, such as perchloroethylene, 1,1,2,2-tetrachloro-1,2-difluoroethane or 1,1,2-trichloro-1,2,2-trifluoroethane at about reflux temperature to make a 5–10% solution, then stirring in the adjuvant in an approximately chemically equivalent amount. The reaction is promoted by adding a small amount of glacial acetic acid. After a reaction period of 1 to 2 hours at reflux temperature, the product is insolubilized by cooling to room temperature. The solvent is allowed to evaporate and the modified copolymer is recovered.

The reaction of the copolymer having a basic site and the adjuvant having an acidic site can be carried out in a manner similar to that described above for the other types of copolymer and adjuvant. Aqueous suspensions of the two components likewise can be employed, as can an aqueous suspension of the copolymer and a solution of the adjuvant. Following is a general description of the preparation of an aqueous suspension, as employed in Example 1, of a copolymer of ethylene and 2-(N,N-dimethylamino)ethyl methacrylate.

The dispersion is formed by mixing the copolymer, water and an acid in amounts sufficient to provide a solids content of about 5–30 weight percent (preferably 10–20%) and a degree of neutralization of the polymer amine groups of about 40–100% (preferably 60–70%), at a temperature such that the copolymer generally will be dispersed into a particle size less than 0.1 micron. Generally, the temperature required will increase with increasing ethylene content and for the copolymers used herein and containing more than 50% ethylene units, the mixture is heated above the melting point of the copolymer. The solids level will vary with the type of acid used and the degree of neutralization. While dispersion pH is inherent in that the copolymer is self-dispersed with the acid, the pH of the dispersion as prepared will be between pH 3 and 6. After preparation the pH of the dispersion can be adjusted, especially downward, to a pH of 1, without adversely affecting the dispersion. A pH of less than 3 during preparation results in gelation of the dispersion, whereas a pH of greater than 6 during preparation results in the formation of a partial dispersion. Vigorous stirring of the mixture is not needed; however, it does decrease the time required to form the dispersion.

The acid used to disperse the copolymer and give it the properties of a cationic polyelectrolyte can be any inorganic or organic acid having a dissociation constant ($K_a$) greater than $1 \times 10^{-5}$. Such acids are preferably the mineral acids, that is, sulfuric acid, hydrochloric acid, nitric acid, perchloric acid, hydrofluoric acid, hydrobromic acid, hydroiodic acid and phosphoric acid. However, water soluble organic acids can be used, such as acetic acid and its halogenated derivatives, oxalic acid, formic acid and citric acid. Although dispersions can be formed with any of these acids, more acid is needed to form the dispersion when the acid used has a lower dissociation constant.

The degree of neutralization of the copolymer amine groups by strong acids is at least 40%, but generally will be within the range of about 40–100%, preferably 60–70%. If the degree of neutralization is lower than about 40%, the particle size of the copolymer tends to become too large. For weak acids ($K_a$ is less than $1 \times 10^{-2}$) the degree of neutralization will also be 40–100%. However, it must be calculated from the theory of weak acids and weak bases rather than stoichiometry.

The copolymer particles in the dispersion are cationically charged and the particle size usually is less than 0.1 micron and may be as small as 0.001 micron. Particle size depends on the acid and the copolymer used. Generally, the particle size will be within the range of 0.01–0.05 micron.

The copolymers of the present invention and having the adjuvant ionically bonded thereto exhibit the physical characteristics of the parent copolymer. The copolymer is added to the substantially hydrocarbon polymer to be stabilized against ultraviolet light or oxidation before the hydrocarbon polymer is converted into its desired shape, such as a film or fiber. It can be added by any of the many prior art, efficient, mixing or blending techniques, such as in a Banbury mixer or in a commercial extruder incorporating a mixing stage. Satisfactory blends can also be made by dissolving both the hydrocarbon polymer and the copolymer of this invention in a suitable solvent, then evaporating the solvent.

The copolymers of this invention will be added to the substantially hydrocarbon polymer in an amount which is sufficient to effect the desired stabilization, referred to herein as an effective amount. The amount will vary with the amount of stabilizer ionically bonded to the acidic or basic copolymer. The amount of adjuvant stabilizer (that is, exclusive of the weight of the copolymer moiety) in the hydrocarbon polymer may be 0.1–10%; usually, it will be 1–2%.

EXAMPLE 1

100 grams of a 70/30 ethylene/2-(N,N-dimethylamino)-ethyl methacrylate copolymer (prepared by prior art techniques, for example, as disclosed in Example 1 of U.S. Pat. 3,383,373) and 10 grams of concentrated nitric acid were heated to the boil with agitation in one liter of water. Upon continued heating at the boil for a few minutes, a uniform dispersion resulted. The dispersion remained stable on subsequent cooling to room temperature. In this mixture about 70% of the amine sites of the copolymer were neutralized with the acid. In another vessel 2 grams of the ultraviolet light absorber 2-carboxy-2'-hydroxy-5'-methylbenzophenone were slurried in 500 ml. of water at 80° C.; the pH was 5.2. Then 10 ml. of 10% lithium hydroxide were added, raising the pH to 12.2. Nearly all of the solid went into solution. The pH was then adjusted to about 7.5 by adding 10% nitric acid, without causing precipitation. After cooling the mixture to 60° C., 80 ml. of the 10% copolymer dispersion were added with agitation to produce a slurry having a pH of 5.8. After a few minutes stirring the solid polymer was collected by filtration, washed with about 200 ml. of cold water, and dried in a vacuum oven at 50° C.

The effectiveness of the above polymeric stabilizer was tested in polypropylene. Each of the two polypropylene films was prepared from 950 mg. of polypropylene (commercially available as "Profax" 6501). The coarse granules of polypropylene were placed in a heated hydraulic press between two 8-inch by 8-inch polished steel plates. Temperature of the plates was adjusted to 232° C. and pressure was applied slowly, building up to 2,000 p.s.i. in about one minute, then held at 2,000 p.s.i. for one minute and released. After two clear colorless films had been prepared in this way and weighed, a weighed amount of the adjuvant-polymer was placed between them and the combined films were pressed into a single film containing the additive in known concentration. In order to obtain uniform distribution of the additive in the final film to be tested, the film was then cut into small pieces and repressed under the same time and temperature conditions as originally. This process of cutting and reforming the film was repeated seven times. The final film contained 1 weight percent of the ultraviolet light absorber. Samples of the prepared film were tested for susceptibility to extraction and loss of the stabilizer: (1) by exposure to perchloroethylene and to aqueous detergent solution (0.6% aqueous "Tide"); (2) by subjection to oven ageing at 150° C.; and (3) by exposure to ultraviolet light in an "Atlas" Xenon Arc Fade-Ometer. Determination of the amount of stabilizer retained through each test was made by measuring ultraviolet absorbancy at peak absorption wave length after exposure and comparing to an unexposed control.

The films containing the stabilizer retained 100% of the absorber through 75 minutes of perchloroethylene exposure and through 5 hours of aqueous detergent exposure. After 30 minutes in a 150° C. oven, 16% of the original ultraviolet absorption strength was retained. After 875 hours of exposure in the Fade-Ometer, the test film was not brittle but maintained its resiliency. In contrast, when films were prepared containing 2-carboxy-2'-hydroxy-5'-methylbenzophenone itself in the same concentration and under the same conditions of pressure and temperature, the following test results were obtained. After 75 minutes exposure to perchloroethylene, 85% of the stabilizer had been extracted from the film. After one hour of exposure to aqueous detergent, all of the stabilizer had been extracted. After 30 minutes in a 150° C. oven, none of the original ultraviolet absorption strength was retained. The film failed and became quite brittle after 350 hours exposure in the Fade-Ometer.

EXAMPLE 2

A commercially available ultraviolet light absorber 2-(2' - hydroxy - 5' - methylphenyl)benzotriazole was sulfonated by stirring in a 10/1 molar excess of 96% sulfuric acid at 100° C. for several hours and drowning in cold aqueous 10% sodium chloride solution. The product was collected by filtration and dried under vacuum at 40° C. Analysis indicated that the ultraviolet light absorber had been monosulfonated. Example 1 was then repeated except that the sulfonated benzotriazole was used in place of the carboxybenzophenone. The stabilized polyproylene films which were produced as in Example 1 and containing the copolymer-absorber combination, upon evaluation, retained 66% of the ultraviolet light absorber through 75 minutes exposure to perchloroethylene, 60% of the absorber through 5 hours exposure to 0.6% aqueous detergent and 31% of the absorber through 2.5 hours of oven ageing at 150° C. Films failed and became brittle after 560 hours exposure in the Fade-Ometer. In contrast, with polypropylene films containing only the absorber or sulfonated absorber, the active ingredient was extracted after 15 minutes exposure to perchloroethylene or 1 hour exposure to aqueous detergent solution. Ultraviolet absorption activity was lost after 0.5 hour at 150° C. in both cases. Both samples failed (became brittle) after 200-250 hours exposure in the Fade-Ometer.

EXAMPLE 3

The ultraviolet light absorber 2,4-dihydroxybenzophenone was sulfonated by heating in a 10/1 molar excess of 96% sulfuric acid at 50-55° C. for several hours. The reaction mixture was drowned in cold saturated sodium chloride solution and the solid product was isolated by filtration. After drying in a vacuum oven at 80° C., the product was recrystallized from ethanol (15 ml./gram). Mass spectrometer and elemental analyses showed it to be sodium 2,4-dihydroxybenzophenone-5-sulfonate. A polymer additive was prepared as follows using the same ethylene/dimethylaminoethyl methacrylate copolymer described in Example 1. Five grams of the absorber was slurried in 50 ml. of water at 80° C. and the pH was adjusted to 8.3 by adding soda ash. After cooling to 60° C., 200 ml. of the 10% copolymer dispersion (prepared as in Example 1) was added and the pH was adjusted to 6.5 by adding 10% nitric acid. The solid product was isolated by filtration, then washed with 200 ml. water and dried in a vacuum oven at 50° C. Polypropylene test films were prepared as in Example 1 containing the equivalent of 1% of the absorber (calculated as unsulfonated material). When tested, the films retained 69% ultraviolet absorbency through 75 minutes of perchloroethylene exposure, 35% absorbency through 5 hours exposure to 0.6% aqueous detergent and 30% of the absorbency after 0.5 hour oven ageing at 150° C. (10% after 2.5 hours). The film failed (became brittle) after 400 hours exposure in the Fade-Ometer.

The embodiments of the invention in which an exclusive property or privilege is claimed are defined as follows:

1. Substantially hydrocarbon copolymeric stabilizer consisting of, on a weight basis, greater than 50% polymer repeat units derived from ethylene and less than 50% polymer repeat units derived from a comonomer which is copolymerizable with the ethylene and which contains a reactive basic site, said comonomer having the formula $CH_2=CR^1COOC_nH_{2n}N(R^2)R^3$ wherein $n$ is 2-4, $R^1$ is H or $CH_3$ and each of $R^2$ and $R^3$ is selected from H and $C_{1-4}$ alkyl, said reactive basic site having ionically bonded thereto a complementary acidic site of an ultraviolet light absorber having an acidic site.

2. The stabilizer of Claim 1 wherein $n$ is 2 and $R^1$, $R^2$ and $R^3$ are $CH_3$.

3. The stabilizer of Claim 1 wherein the ultraviolet light absorber is 2 - carboxy-2'-hydroxy-5'-methylbenzophenone.

4. The stabilizer of Claim 1 wherein the ultraviolet light absorber is ulfonated 2 - (2'-hydroxy-5'-methylphenyl)benzotriazole.

5. The stabilizer of Claim 1 wherein the ultraviolet light absorber is sulfonated 2,4-dihydroxybenzophenone.

References Cited

UNITED STATES PATENTS

| 2,808,349 | 10/1957 | Melamed | 117—139.5 |
| 3,072,585 | 1/1963 | Milionis | 260—22 |
| 3,497,549 | 2/1970 | Dexter | 260—473 |

CHRISTOPHER A. HENDERSON, JR.,
Primary Examiner

U.S. Cl. X.R.

260—78.5, 79.3 R, 86.1 N, 896, 897 R, Dig. 31